United States Patent
Cook et al.

(10) Patent No.: US 6,796,666 B1
(45) Date of Patent: Sep. 28, 2004

(54) FOUR-POINT PLANAR MECHANICAL MOUNT WITH HIGH PRECISION

(75) Inventors: Stephen J. Cook, Loveland, CO (US); David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 08/733,291

(22) Filed: Oct. 17, 1996

(51) Int. Cl.$^7$ .............................................. G02B 7/182
(52) U.S. Cl. ...................... 359/871; 359/872; 359/873; 359/881
(58) Field of Search ................................ 359/871, 872, 359/873, 881, 224, 225

(56) References Cited

U.S. PATENT DOCUMENTS

| | | | | |
|---|---|---|---|---|
| 4,157,861 A | * | 6/1979 | Davies | ........................ 359/225 |
| 4,576,449 A | * | 3/1986 | Ruger | ........................ 359/225 |

FOREIGN PATENT DOCUMENTS

| | | | | |
|---|---|---|---|---|
| DE | 4133330 | * | 4/1993 | ................ 359/871 |

* cited by examiner

Primary Examiner—Mohammad Sikder
(74) Attorney, Agent, or Firm—Augustus W. Winfield

(57) ABSTRACT

An apparatus for mounting an object precisely in a specific plane. An object is mounted on small support points rather than flat pads or other flat surfaces. The support points are stiff but not completely rigid. Exactly four support points are used. Mechanical forces are sufficient to slightly compress the two higher support points on a diagonal and to slightly compress the object so that the object presses against all the support points, with a higher amount of compression for one pair of diagonal points relative to the other two points. In an example embodiment, the support points are formed at the intersection of curved surfaces or at the intersection of multiple planar surfaces. In a specific example embodiment, the points are formed at the intersection of cylindrical surfaces. The points are fabricated by a cylindrical cutting bit that has partial-cylinder grooves formed circumferentially in the bit. The outer surface of the bit is used to mill two intersecting planes, and the grooves result in cylindrical surfaces intersecting at the same angle as the intersecting planes. The resulting support points are true singular points, but with limited compressibility because of the shallow angle of the material just below the points.

5 Claims, 6 Drawing Sheets

FOUR-POINT PLANAR MECHANICAL MOUNT WITH HIGH PRECISION

FIELD OF INVENTION

This invention relates generally to mechanical systems and more specifically to precision mounting systems relative to a reference plane, with specific application to planar optical components.

BACKGROUND OF THE INVENTION

Many mechanical assemblies require a component to be precisely positioned on a specific plane. Three points define a plane. It is common to clamp a component against exactly three precise reference pads. For example, some data tape drives use tape cartridges having a metal plate. In these drives, the metal plate must be aligned precisely relative to a magnetic head. The metal plate is typically clamped against exactly three reference pads in a drive chassis. As another example, many optical systems have mirrors, prisms or beam splitter components with a flat side that must be precisely positioned relative to other optical components. It is common to clamp a flat side of these components against exactly three reference pads in a support structure.

In general, more than three pads cannot be fabricated to be perfectly co-planar. If a component is clamped against more than three reference pads, the component is typically either rigidly supported on the three highest reference pads or the component warps to conform to the slightly non-planar (and non-predictable) shape defined by multiple reference pads or the pads deform to a non-predictable (and imprecise) position. However, even though three-pad mounts are assumed to be preferable, there may also be problems with three-pad mounts as illustrated below.

FIGS. 1A and 1B illustrate a typical prior art three-pad rigid mount of a long rectangular flat object 100 with mechanical clamping. FIG. 1A depicts a top view, with three flat pads (102, 104, 106). Clamps press at the points indicated by reference numbers 108 and 110. FIG. 1B illustrates a side view with the clamping forces depicted by arrows 112 and 114. FIG. 1C illustrates an end view of pad 102. In general, machining marks on pad 102 will create some high and low points so that pad 102 is never perfectly flat. In addition, object 100 is never perfectly rigid. Object 100 rests on the highest point or highest surface of pad 102. If clamping force 112 is slightly off-center relative to the highest point or highest surface on pad 102, the high point of pad 102 acts as a pivot point and force 112 tends to cause the object 100 to bend or twist slightly. This is illustrated in figure 1C, with off-center force 112 tending to cause object 100 to bend toward the position depicted by the dashed lines 116. This may change the plane of a critical surface of the object 100 or cause a critical surface of object 100 to be non-planar. With mechanical shock, the object 100 may move from an initial high point on pad 102 to a different high point on pad 102. This may directly change the plane and may also change the pivot point resulting in a different bending or twisting. If clamping force 112 is slightly non-vertical, there is a transverse force 118 on the object 100, tending to cause object 100 to twist or if friction is overcome the object may slide. The system might be initially calibrated, and then with mechanical shock sliding may result in different high points, different bending and different twisting, with all these changes being non-predictable. In some mechanical systems, these slight pivoting, bending, twisting and sliding motions are too small to be of importance. However, some systems require a very high precision that cannot be satisfied by the mounting system illustrated in FIGS. 1A, 1B and 1C. Alternatively, in some systems an initial calibration is made that might be unacceptably altered if the plane or bending of the object shifts with later mechanical shock.

Objects may also be mounted by using an adhesive. In general, adhesives eliminate distortion problems due to clamping forces. In a high-volume production environment, however, curing time may be a disadvantage. In addition, adhesives may result in distortion if there is a thermal mismatch between the material of the mounted object and the material of the substrate. Some adhesives may be susceptible to failure during extreme environmental conditions (heat, humidity, mechanical shock). In general, for high volume manufacturing, mechanical clamping is often the preferred method of mounting.

There is a need for a rigid planar mount with simple mechanical clamping with high precision and predictability. There is an additional need for stable high precision even with mechanical shock.

SUMMARY OF THE INVENTION

A precision planar mount is provided with the following important attributes:

1. Support points are symmetrical in pairs about the clamping forces, eliminating bending due to misaligned clamping forces. If there are transverse clamping forces, the mounted object can move without changing its shape or plane.
2. True points are used for support rather than flat pad surfaces, eliminating shifting to different points after mechanical shock.
3. The support points are fabricated with shallow angles, providing a stiff mount with controlled compressibility. By design, the points compress by about half of the worst case machining tolerance, reducing the overall variation due to machining.
4. Exactly four points are used, providing the symmetry of attribute 1 above and providing a predictable bending shape that is controlled to an acceptable amount.

The support points are formed at the intersection of curved surfaces or at the intersection of multiple planar surfaces. In an example embodiment, the points are formed at the intersection of cylindrical surfaces. The points are fabricated by a milling bit comprising a cylindrical machining cutter with partial-cylindrical grooves formed circumferentially in the bit. The outer surface of the milling bit is used to mill two intersecting planes, and the grooves in the milling bit result in sections of cylindrical surfaces intersecting at the same angle as the intersecting planes. The resulting support points are true singular points, but with limited compressibility because of the shallow angles of the material just below the points.

In a specific embodiment, the object is a glass mirror. The mechanical clamping forces are sufficient to slightly compress the support points and the glass in the mirror so that the mirror presses against all the support points, with differing amounts of compression at each point.

DETAILED DESCRIPTION OF THE PREFERRED EMBODIMENT OF THE INVENTION

For purposes of illustration, a flat rectangular mirror is used as an example of an object to be clamped at a plane. However, the use of exactly four slightly compressible points is applicable to other precision mounting assemblies.

Figure 2A:
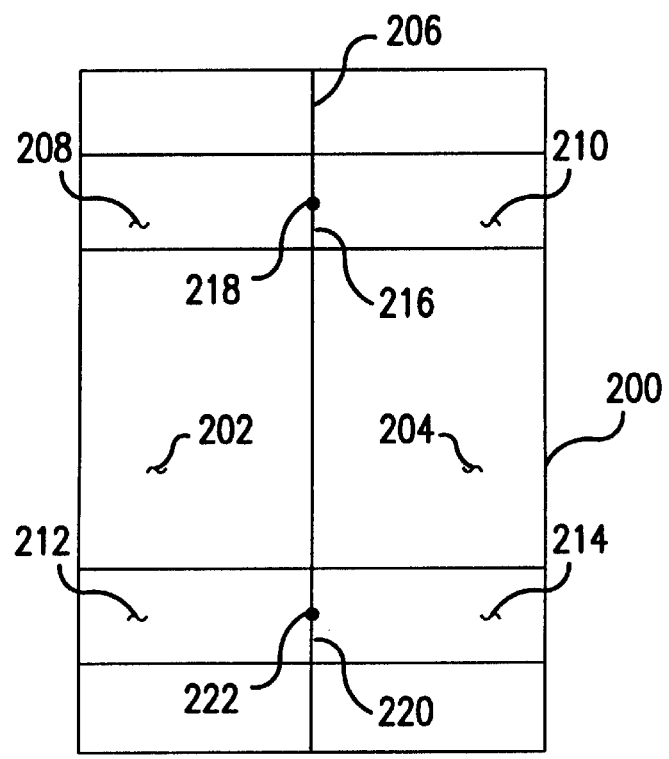
FIG. 2A is a top view of a structure providing two support points for mounting one end of a mirror in accordance with the invention.
Figure 2B:
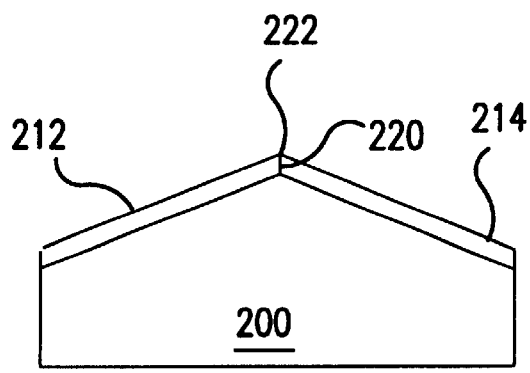
FIG. 2B is a side view of the structure of FIG. 2A.
Figure 2C:
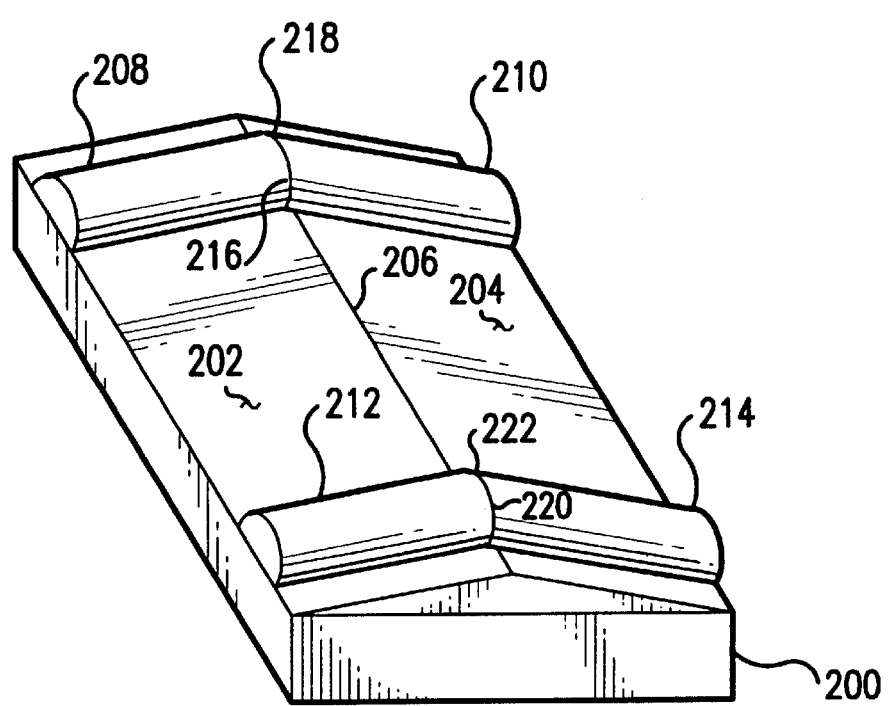
FIG. 2C is a perspective view of the structure of FIG. 2A.

FIG. 2A illustrates a top view of a support 200 for one end of a flat rectangular mirror. Support 200 has two plane surfaces 202 and 204 that are not co-planar, intersecting along a line 206. Superimposed on the plane surfaces are curved surfaces 208, 210, 212, and 214. Curved surfaces 208 and 210 intersect along a line 216, with a single high point depicted by reference number 218. Curved surfaces 212 and 214 intersect along a line 220, with a single high point depicted by reference number 222. FIG. 2B is an end view of the support 200 illustrated in FIG. 2A. FIG. 2C is a perspective view of the support 200 illustrated in FIG. 2A.

Figure 3:
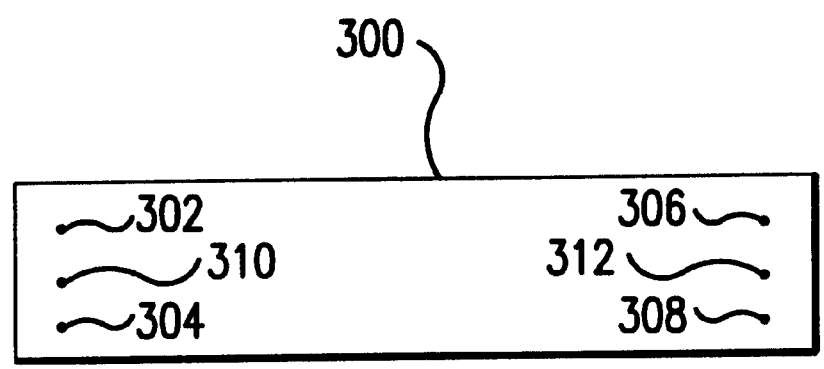
FIG. 3 is a top view of a mirror supported by structures as illustrated in FIGS. 2A–2C.

FIG. 3 is a top view of a rectangular mirror 300 supported at each end by a support of the type illustrated in FIGS. 2A–2C. Mirror 300 is supported on four support points 302, 304, 306, 308. Support points 302, 302, 306 and 308 correspond to points 218 and 222 in FIGS. 2A–2C. Mechanical clamping forces are applied at points 310 and 312, halfway between points 302 and 304 and halfway between points 306 and 308 respectively. The two clamping forces are applied on the opposite side of the mirror 300 from the support points, forcing the mirror 300 against the support points. In general, points 302, 304, 306 and 308 cannot be machined exactly co-planar. However, they can be compressed to be closer to co-planar. In addition, the glass mirror compresses slightly at the point of contact of the support points. Therefore, the mount is stiff, but not completely rigid.

In general, with four support points, the mirror 300 will tend to bend slightly around the diagonal line connecting the highest support point and its opposite diagonal support point. Assume for illustration that in FIG. 3, point 302 is the highest point. Mirror 300 will initially touch point 302 and the diagonally opposite point 308. The mirror 300 will tend to bend around the diagonal line connecting points 302 and 308. The forces applied at points 310 and 312 will tend to force the mirror 300 to bend so that it also touches points 304 and 306.

Because the support points are single points, they are compressible, but compression is limited because of the shallow angle of the surrounding material. Forces applied at points 310 and 312 are sufficient to slightly compress the two points on the diagonal that includes the highest point (304 and 306, or 302 and 308) and to slightly compress the glass. The two points on the diagonal that includes the highest point are compressed more than the other two points. Therefore, the four points are more closely co-planar after applying the mechanical forces.

With two support points 302 and 304 on either side of clamping point 310, and two support points 306 and 308 on either side of clamping point 312, there is no pivoting around the support points. Sliding the mirror does not result in the mirror being supported at new high points. Providing slightly compressible support points reduces the bending and warping problems usually associated with having more than three support points. The mirror will bend slightly, but in a predictable way along a diagonal, and in a predictable amount limited to the amount of non-planarity after compression.

The force magnitudes and support point compressibility in the invention are carefully designed to improve planarity after compression. With the invention, with stiff but not rigid points, the compression is about half the worst case machining tolerance range of the support points, so that the highest point is typically compressed down to about the height of the lowest point, and the lowest point is compressed very little. Therefore, variation of support point heights resulting from machining tolerance is reduced after compression. If the support points were hypothetically absolutely non-compressible, the mirror planarity would be limited to the accuracy of the support point machining and the mirror would bend along a diagonal with the total bending limited by the tolerances of the support point machining. If the support points were hypothetically very compressible, or if the clamping forces were very high, so that all points were compressed extensively, the uncertainty in the resulting planarity would increase relative to the tolerances of the support point machining because the total compression would not be controlled.

Figure 1A:
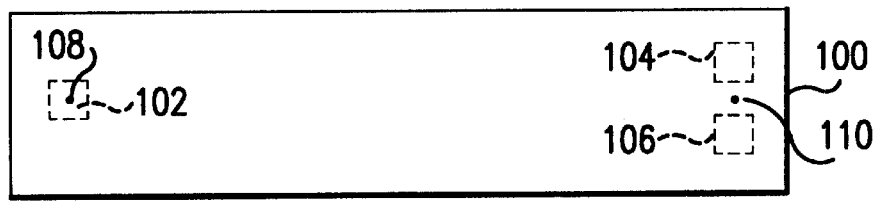
FIG. 1A (prior art) is a top view of an object mechanically clamped to three support pads.
Figure 1B:
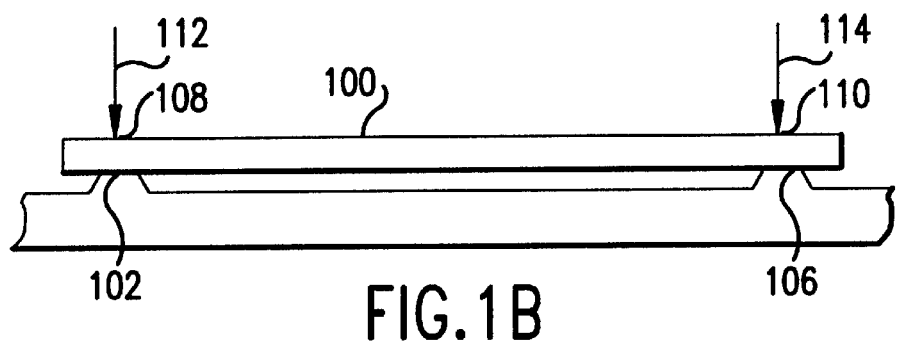
FIG. 1B (prior art) is a side view of the object and mounting arrangement of FIG. 1A.
Figure 1C:
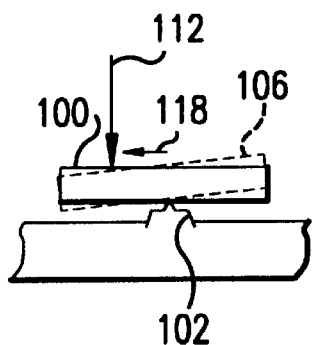
FIG. 1C (prior art) is an end view of the object and mounting arrangement of FIGS. 1A and 1B.
Figure 4A:
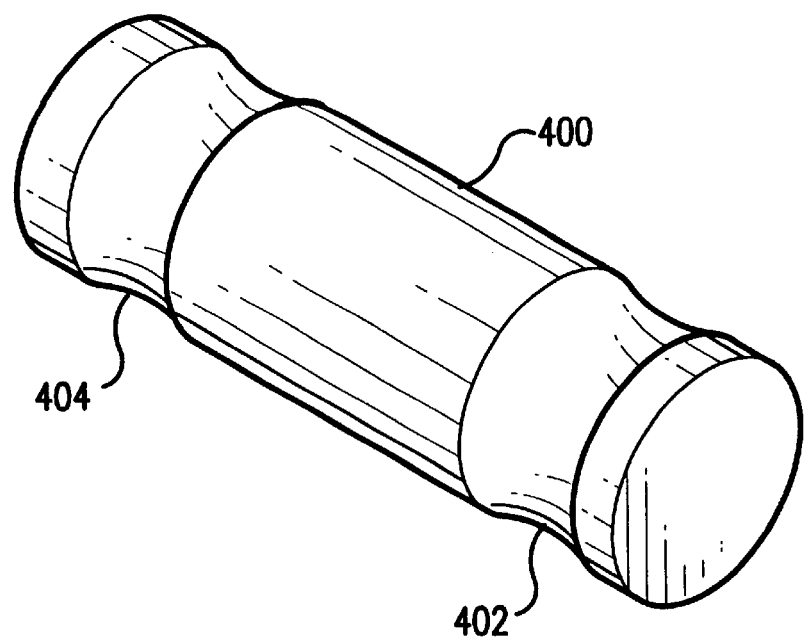
FIG. 4A is a perspective view of a milling bit suitable for use in forming the support points illustrated in FIGS. 2A–2C.
Figure 4B:
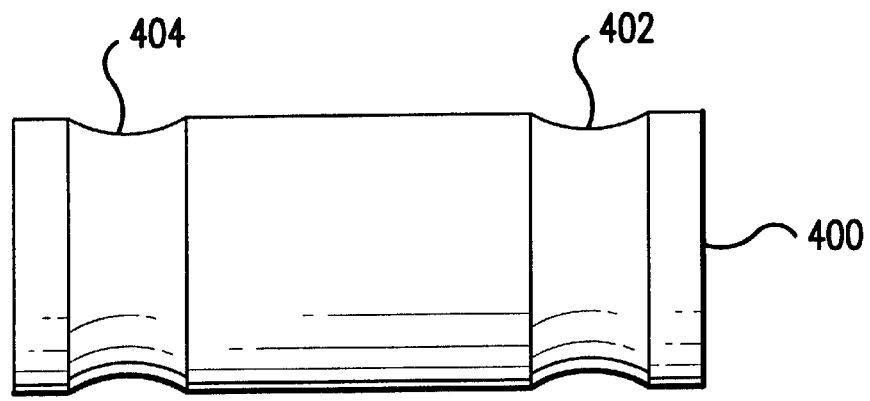
FIG. 4B is a side view of the milling bit of FIG. 4A.

FIG. 4A illustrates a milling bit 400 suitable for forming the support 200 (FIGS. 2A–2C). Bit 400 is cylindrical, with circumferential partial-cylindrical grooves 402 and 404. FIG. 4B is a side view better illustrating the partial-cylindrical grooves 402 and 404. Referring to FIG. 2C, as bit 400 is moved to cut planar surfaces 202 and 204, cylindrical surfaces 208, 210, 212, and 214 are formed by grooves 402 and 404. Mounting holes for a mechanical clamp are drilled with the same machining set-up to accurately position the clamp relative to the supporting points. Typically, flat pads as illustrated in FIGS. 1A–1C are ground flat in a separate operation. Note that with a milling bit as illustrated in FIGS. 4A and 4B, fabrication of precision support points is accomplished by a single cutting operation, which is typically lower cost than grinding.

It is not essential for the support points to be defined by two intersecting cylindrical surfaces. Any surface shape that results in a single highest point with a shallow angle for the surrounding material may be suitable. For example, grooves 402 and 404 may be "V" shaped, resulting in four planes intersecting at a point. Alternatively, for example, cylindrical columns may be formed and then cut at a shallow angle or rectangular columns may be formed and then cut at a shallow angle so that a corner is a high point. Note, however, that the intersecting cylindrical surfaces illustrated in FIGS. 2A through 2C provide particularly shallow angles, providing particularly stiff points.

Figure 5A:
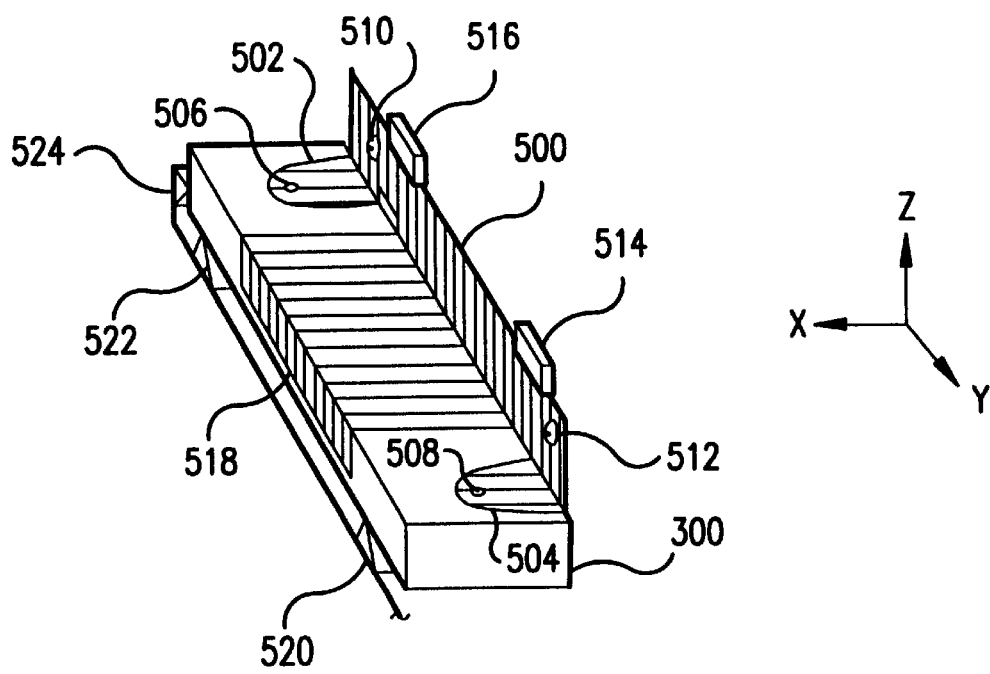
FIG. 5A is a perspective view of a mechanical clamp suitable for use with support structures as illustrated in FIGS. 2A–2C.
Figure 5B:
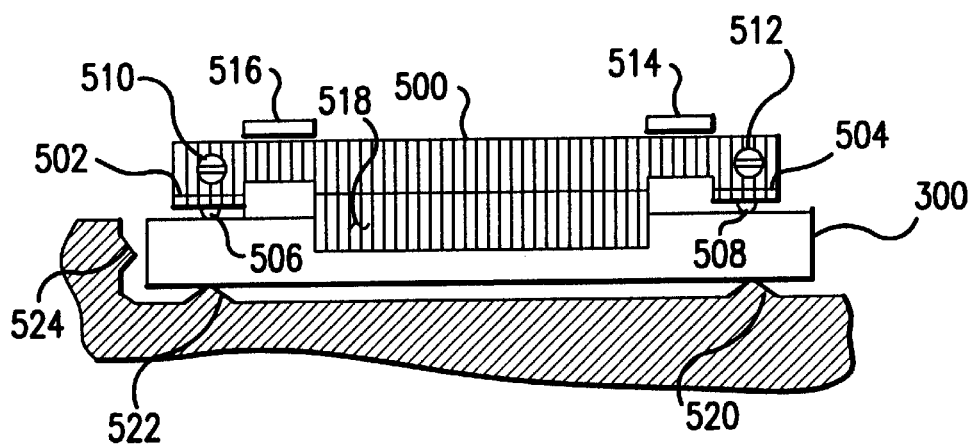
FIG. 5B is a side view of the mechanical clamp of FIG. 5A.

FIGS. 5A and 5B illustrate a metal bracket 500 for providing the clamping forces. Bracket 500 is attached by screws 510 and 512 to an aluminum support structure, only parts of which are illustrated. Supports 520, 522 and 524 are machined surfaces on the aluminum support structure, and each is formed with two support points as illustrated by support 200 in FIGS. 2A–2C. Bracket 500 has two flat fingers 502 and 504 with indentations 506 and 508. Indentations 506 and 508 provide force in the Z dimension at points 310 and 312 (FIG. 3) on mirror 300, pressing mirror 300 against supports 522 and 520 respectively. The aluminum support structure includes stops 514 and 516 to help hold bracket 500 in place along the Z dimension. The bracket 500 includes a lip 518 that helps hold the mirror in place along the X dimension. The same cutting operation that forms support 522 in the aluminum support structure is also used to conveniently form support 524 which provides a stop position for mirror 300 in the Y dimension. Mounting holes for screws 510 and 512 are drilled into the support structure using the same machining set-up as for machining the supports (520, 522 and 524).

In the embodiment illustrated in FIGS. 5A and 5B, it is not necessary for the mirror 300 to touch stops 514 and 516, lip 518, or support 524. None of these are necessary for clamping or defining a plane. Their primary function is to prevent extreme movement in case of extreme mechanical shock. In general, friction prevents movement in the X and Y dimensions and fingers 502 and 504 and supports 520 and 522 prevent movement in the Z dimension.

In a specific embodiment, mirror 300 is approximately 0.25 inches thick. The reflecting surface is mounted adjacent to the support points. The material for the support points is cast aluminum. The bracket 500 provides a clamping force of about 11 pounds at each end (22 pounds total, 5.5 pounds on each of the four support points). The glass mirror 300 compresses slightly at the support points. Total compression of the glass mirror 300 and the two higher diagonal support points is about 0.001 inch. The support points are milled to a co-planarity accuracy of about ±0.0012 inch. After compression, the points are co-planar to less than ±0.00025 inch, an accuracy that would be relatively expensive to obtain by machined pads. In addition, distortion due to bending is substantially reduced relative to a three-point mount with supports having an equivalent accuracy. Finally, the accuracy is not affected if the mirror slides slightly in the X-Y plane with mechanical shock and vibration.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for mounting an object, the apparatus comprising:

four supports, each support fabricated from a stiff material and tapered to a point, thereby forming four points, the four points fabricated to be co-planar to a fabrication tolerance range;

a source of mechanical force; and the mechanical force pressing the object against the four points in a manner that compresses the points a distance that is less than the fabrication tolerance range, so that the four points are more co-planar after compression than when fabricated.

2. The apparatus of claim 1 further comprising:

the four points comprising a first pair of points and a second pair of points, the source of mechanical force providing a first force and a second force, the first force being applied midway between the points in the first pair of points and the second force being applied midway between the points in the second pair of support points.

3. The apparatus of claim 2, wherein each point is formed from the intersection of two non-planar surfaces.

4. The apparatus of claim 3, wherein each of the non-planar surfaces is cylindrical.

5. The apparatus of claim 3, wherein each of the non-planar surfaces is two intersecting planar surfaces.

* * * * *